(12) United States Patent
Hyun et al.

(10) Patent No.: US 10,289,298 B2
(45) Date of Patent: *May 14, 2019

(54) INTERFACE METHOD FOR A PORTABLE TERMINAL

(71) Applicant: Samsung Electronics Co., Ltd., Gyeonggi-do (KR)

(72) Inventors: Yu-Seok Hyun, Gyeongsangbuk-do (KR); Young-Hae Kim, Gyeonggi-do (KR); Hae-Shik Yea, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 82 days.

This patent is subject to a terminal disclaimer.

(21) Appl. No.: 14/059,646

(22) Filed: Oct. 22, 2013

(65) Prior Publication Data

US 2014/0040804 A1    Feb. 6, 2014

Related U.S. Application Data

(63) Continuation of application No. 13/161,600, filed on Jun. 16, 2011, now Pat. No. 8,565,833.

(30) Foreign Application Priority Data

Jun. 16, 2010  (KR) .................. 10-2010-0057215

(51) Int. Cl.
 *G06F 3/0488* (2013.01)
 *G06F 3/0486* (2013.01)
 *G06F 3/0482* (2013.01)

(52) U.S. Cl.
 CPC .......... *G06F 3/0488* (2013.01); *G06F 3/0482* (2013.01); *G06F 3/0486* (2013.01); *G06F 3/04883* (2013.01); *G06F 3/04886* (2013.01)

(58) Field of Classification Search
 CPC .............................. G06F 3/0486; G06F 3/0488
 See application file for complete search history.

(56) References Cited

U.S. PATENT DOCUMENTS 5,422,993 A * 6/1995 Fleming .............. G06F 3/04812
                                                              345/163
5,953,008 A * 9/1999 Hagiuda ............... G06F 3/0486
                                                              345/630

(Continued)

FOREIGN PATENT DOCUMENTS

KR    10-2009-0077597 A    7/2009
KR    10-2010-0037973 A    4/2010
KR    10-2010-0053823 A    5/2010

OTHER PUBLICATIONS

Dictionary.com, "adjacent", http://www.dictionary.com/browse/adjacent, accessed Sep. 15, 2016, printout pp. 1-6.*

(Continued)

*Primary Examiner* — Amy Ng
*Assistant Examiner* — William Wong
(74) *Attorney, Agent, or Firm* — Cha & Reiter, LLC.

(57) ABSTRACT

An interface method for a portable terminal includes generating a separate display area in a display screen when a predetermined area of the display screen is touched and displaying one or more applications in the newly generated display area. Thereafter, when a particular application among the displayed applications is dragged to an outside of the newly generated display area, at least one data item or function associated with the dragged application is displayed within in the newly generated display area.

26 Claims, 5 Drawing Sheets

(56) References Cited

U.S. PATENT DOCUMENTS

| | | | |
|---|---|---|---|
| 6,034,679 A * | 3/2000 | McGrath | G06F 3/033 715/723 |
| 2001/0019338 A1* | 9/2001 | Roth | 345/811 |
| 2005/0044577 A1* | 2/2005 | Jerding | H04N 5/44543 725/135 |
| 2006/0119586 A1 | 6/2006 | Grant et al. | |
| 2007/0162872 A1* | 7/2007 | Hong | G06F 3/0482 715/828 |
| 2007/0283292 A1* | 12/2007 | Bucher | G06F 3/0482 715/810 |
| 2008/0016443 A1* | 1/2008 | Hiroshima et al. | 715/702 |
| 2008/0068350 A1 | 3/2008 | Rosenberg et al. | |
| 2008/0074399 A1* | 3/2008 | Lee | 345/173 |
| 2008/0141153 A1* | 6/2008 | Samson | G06F 3/0481 715/769 |
| 2008/0143685 A1* | 6/2008 | Lee et al. | 345/173 |
| 2008/0155428 A1* | 6/2008 | Lee | 715/745 |
| 2008/0195961 A1* | 8/2008 | Bae et al. | 715/769 |
| 2008/0282196 A1* | 11/2008 | Park | H04M 1/72544 715/838 |
| 2009/0109187 A1* | 4/2009 | Noma | G06F 3/04883 345/173 |
| 2009/0183100 A1 | 7/2009 | Eom et al. | |
| 2009/0219252 A1* | 9/2009 | Jarventie | G06F 3/04886 345/173 |
| 2009/0228820 A1* | 9/2009 | Kim et al. | 715/769 |
| 2009/0271723 A1* | 10/2009 | Matsushima | G06F 3/0482 715/769 |
| 2009/0313567 A1* | 12/2009 | Kwon et al. | 715/769 |
| 2009/0327964 A1* | 12/2009 | Mouilleseaux | G06F 3/0482 715/834 |
| 2010/0083190 A1* | 4/2010 | Roberts et al. | 715/863 |
| 2010/0088598 A1 | 4/2010 | Lee et al. | |
| 2010/0122194 A1* | 5/2010 | Rogers | G06F 3/04817 715/769 |
| 2010/0124967 A1 | 5/2010 | Lutnick et al. | |
| 2010/0125806 A1* | 5/2010 | Igeta | G06F 3/0481 715/770 |
| 2010/0146425 A1* | 6/2010 | Lance | G06F 3/0486 715/769 |
| 2010/0162153 A1* | 6/2010 | Lau | G06F 3/0488 715/769 |
| 2010/0283744 A1* | 11/2010 | Nordenhake | G06F 3/04883 345/173 |
| 2011/0074710 A1* | 3/2011 | Weeldreyer | G06F 3/0481 345/173 |
| 2011/0078624 A1* | 3/2011 | Missig | G06F 3/04883 715/802 |
| 2011/0093778 A1* | 4/2011 | Kim | G06F 3/041 715/702 |
| 2011/0134110 A1* | 6/2011 | Song et al. | 345/419 |
| 2011/0252375 A1* | 10/2011 | Chaudhri | G06F 3/04817 715/835 |

OTHER PUBLICATIONS

Google, "define stationary", https://www.google.com/search?q=define+stationary, accessed Jul. 10, 2017, printout pp. 1-2.*
Korean Search Report dated Apr. 22, 2016.
Korean Search Report dated Oct. 14, 2016.

* cited by examiner

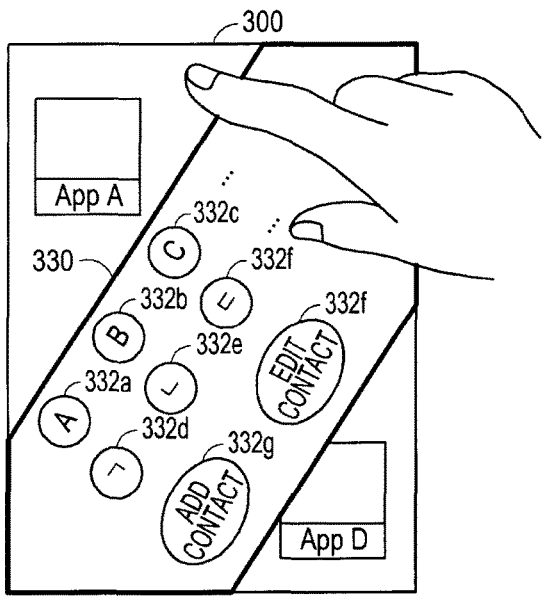
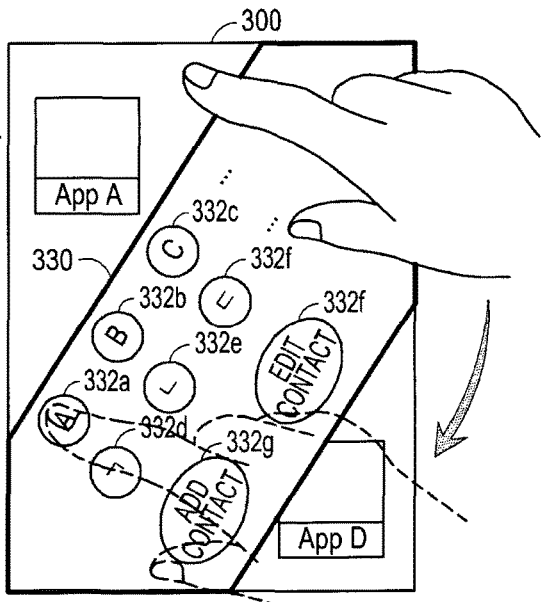
FIG.4A  FIG.4B
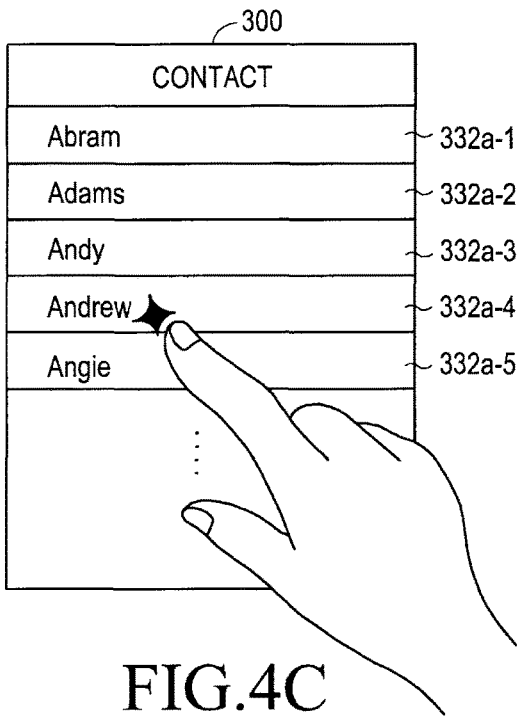
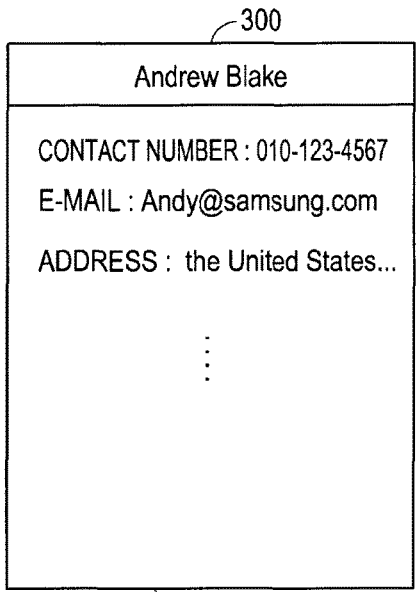
FIG.4C  FIG.4D

INTERFACE METHOD FOR A PORTABLE TERMINAL

CROSS-REFERENCE TO RELATED APPLICATIONS

This application is a continuation of an earlier U.S. patent application Ser. No. 13/161,600, which was filed in the U.S. Patent and Trademark Office on Jun. 16, 2011 and claims the benefit under 35 U.S.C. § 119 to a Korean Patent Application entitled "Method for Using a Portable Terminal" filed in the Korean Intellectual Property Office on Jun. 16, 2010 and assigned Serial No. 10-2010-0057215, the contents of which are incorporated herein by reference.

BACKGROUND

1. Field of the Invention

The present invention relates to a portable terminal, and more particularly to an interface method for the portable terminal.

2. Description of the Related Art

In general, a portable terminal enables a user to perform a voice communication, text and data services. As the mobile communication environments has been developed, the portable terminal application is being gradually diversified from a traditional voice communication to various other fields, which include, for example, use of an Audio On Demand (AOD) service, a Video On Demand (VOD) service, a dynamic image communication in real time using a camera provided in the portable terminal, downloading and playing a game application, and watching digital multimedia broadcasting using a Digital Multimedia Broadcasting (DMB) receiver.

As such, the portable terminal has been evolved into a smart phone type, which typically uses a touch screen as a core input function.

However, in operation of menu in a touch screen, it is necessary to access menus and submenus several times in order to search or identify a desired item or data (e.g. personal information of the communication counterpart through an address book) or to execute an application, thereby causing inconvenience for the user.

SUMMARY OF THE INVENTION

Accordingly, the present invention provides an interface method for a portable terminal in which a user can easily search for data and/or execute an application.

In accordance with an aspect of the present invention, an interface method for a portable terminal having a touch pad includes: generating a separate display area in a display screen when a predetermined area of the display screen is touched, and displaying one or more applications in the generated display area and when a particular application among the displayed applications is dragged to an outside of the generated display area, displaying at least one data item or function among data items or functions, which are associated with the dragged application in the display area. In the embodiment, the touch input is activated continuously on the touch pad without removal of a user's finger after dragging the one application outside the separate display area.

BRIEF DESCRIPTION OF THE DRAWINGS

The above and other aspects, features and advantages of the present invention will be more apparent from the following detailed description taken in conjunction with the accompanying drawings, in which:

FIGS. 4A, 4B, 4C and 4D illustrate screens showing a second example of a procedure for using a portable terminal according to an embodiment of the present invention.

DETAILED DESCRIPTION OF THE INVENTION

Hereinafter, exemplary embodiments of the present invention will be described with reference to the accompanying drawings in detail.

Figure 1:
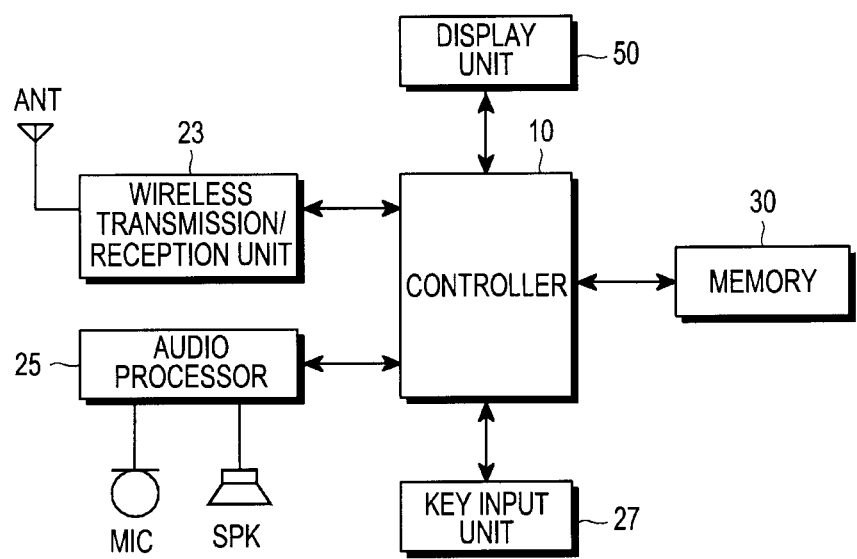
FIG. 1 is a block diagram of a portable terminal according to an embodiment of the present invention.

FIG. 1 is a block diagram of a portable terminal according to an embodiment of the present invention.

Referring to FIG. 1, a key input unit 27 includes keys for inputting number and letter information, and function keys for setting various functions. In the embodiments of the present invention, since a display unit 50 can serve the function of the key input unit 27 via a touch screen, the key input unit 27 according to the embodiments of the present invention may include a minimum number of keys.

A wireless transmission/reception unit 23 performs a wireless communication function of the portable terminal and includes a Radio Frequency (RF) unit and a modem. The RF unit may include an RF transmitter for up-converting and amplifying a frequency of a transmitted signal and an RF receiver for low noise-amplifying and down-converting a received frequency. The modem may include a transmitter for encoding and modulating a signal to be transmitted and a receiver for demodulating and decoding a signal received by the RF unit.

An audio processor 25 may include a codec, and the codec includes a data codec and an audio codec. The data codec processes packet data and the audio codec processes an audio signal such as voice and multimedia files, etc. Further, the audio processor 25 converts a digital audio signal received from a modem to an analog signal through the audio codec and then reproduces the analog signal, or converts an analog audio signal generated from a microphone (MIC) to a digital audio signal through the audio codec and then transfers the digital audio signal to a modem. Here, the codec may include a separate codec or may be included in the controller 10 of the portable terminal.

A memory 30 includes a Read Only Memory (ROM) or a Random Access Memory (RAM). The memory 30 may include a program memory and a data memory, and can store programs for controlling operations of the portable terminal and data for booting the portable terminal. The memory 30 may be an external memory such as a Compact Flash (CF), a Secure Digital (SD), a Micro-Secure Digital (Micro-SD), a Mini-Secure Digital (Mini-SD), an Extreme Digital (xD), a memory stick, etc.

The display unit 50 displays an image signal and user's data in a screen or displays data related to a call performance. The display unit 50 may include a Liquid Crystal Display (LCD), an Organic Light Emitting Diode (OLED), an Active Matrix Organic Light-Emitting Diode (AM OLED), etc. Further, the display unit 50 according to the embodiments of the present invention is implemented by a touch screen method and may be operated as an input unit, which controls the portable terminal, together with the key input unit 27. In general, the display unit 50 displays icons corresponding to applications, and menus and various information (e.g. electro luminescent information, battery information, time information, etc.) used for controlling operations (or functions) of the portable terminal in a display screen. A user can execute the application by touching the icon corresponding the application or control operation of the portable terminal by touching the menu.

A controller 10 performs a function of controlling the whole range of operations of the portable terminal. The controller 10 according to the embodiments of the present invention provides the user with an interface method in accordance with a request made by the user without the cumbersome of consecutively navigating different menu or submenus windows to identify a desired item, data, or function.

In operation, when the user touches a predetermined area of the display screen, the controller 10 generates a separate display area within the display screen such that one or more applications are displayed in the generated display area. When one of the displayed applications is dragged to move to the outside of the display area, the controller 10 controls such that at least one of data or functions, which are associated with the application dragged to the outside of the display area, is displayed within the separate display area. It should be noted that the separate display area may be expanded or reduced in size for display of the data or functions therein.

Figure 2:
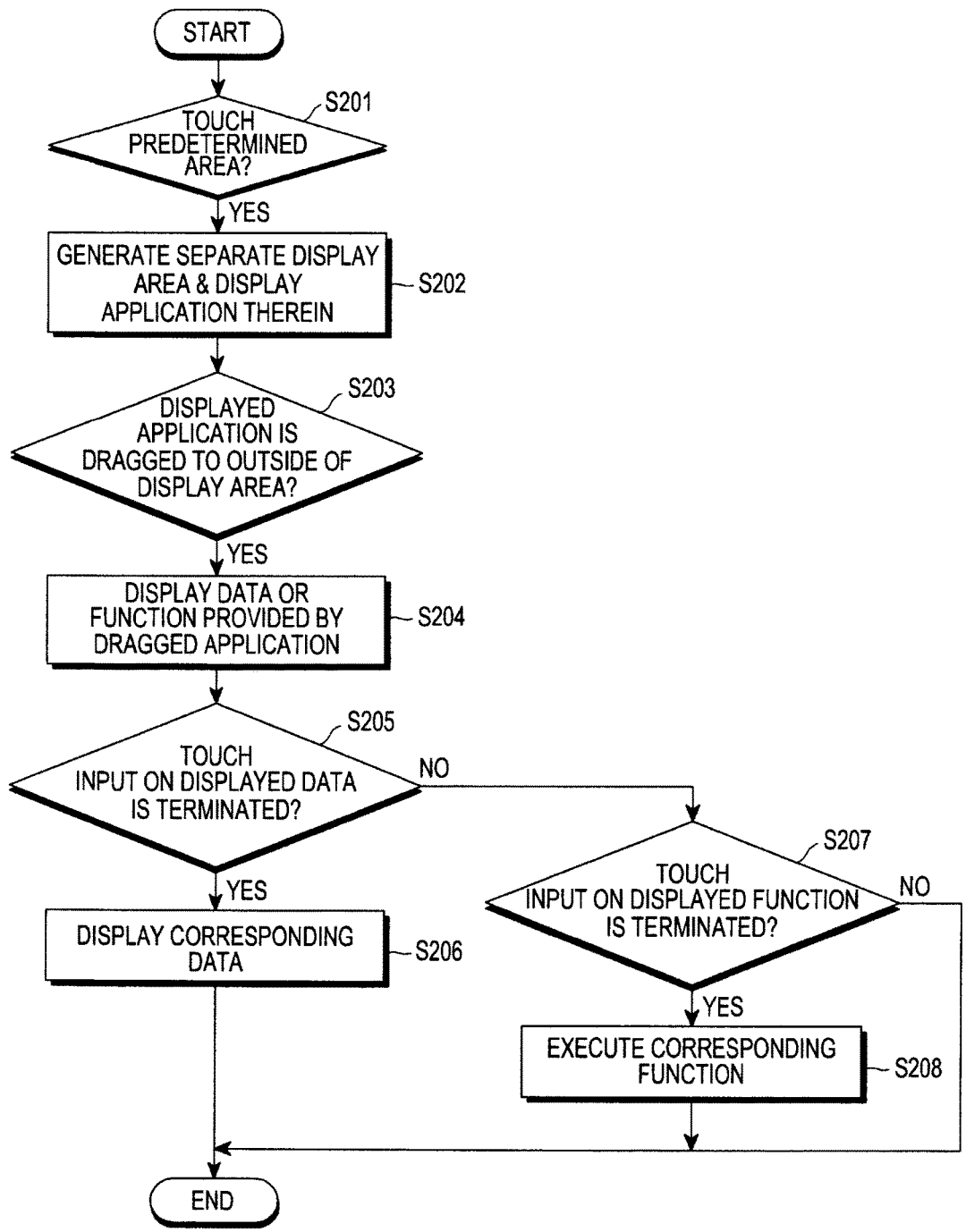
FIG. 2 is a flowchart illustrating a procedure of using a portable terminal according to an embodiment of the present invention.
Figure 5A:
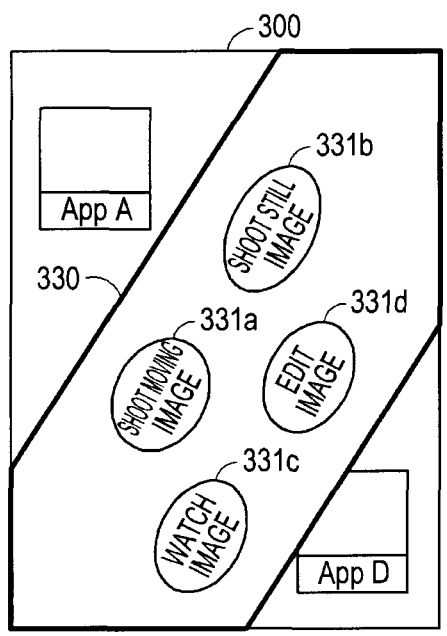
FIGS. 5A and 5B illustrate screens showing a third example of a procedure for using a portable terminal according to an embodiment of the present invention.
Figure 5B:
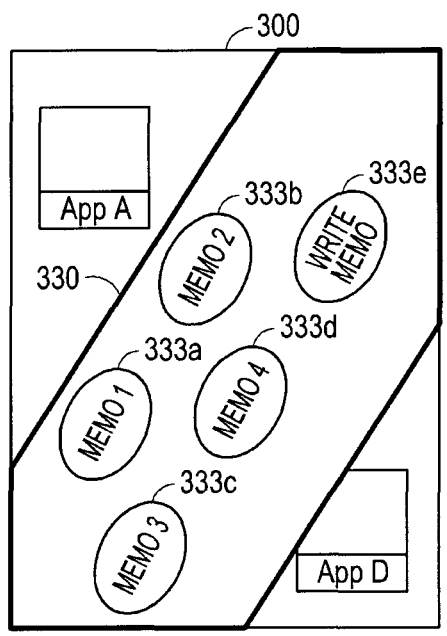

FIG. 2 is a flowchart illustrating a procedure of using a portable terminal according to an embodiment of the present invention, FIGS. 3A to 3D illustrate screens showing a first example using a portable terminal according to an embodiment of the present invention, FIGS. 4A to 4D illustrate screens showing a second example using a portable terminal according to an embodiment of the present invention, and FIGS. 5A to 5B illustrate screens showing a third example using a portable terminal according to an embodiment of the present invention. Note that in the embodiments of the present invention, the touch input or activation thereof includes an input of touching a touch screen and a drag input in which a finger moves on the touch screen while being in contact with the touch screen.

Referring to FIG. 2, in steps S201 to S202, when a user touches a predetermined area, the controller 10 generates a separate display area and controls such that one or more applications are displayed in the generated display area.

Figure 3A:
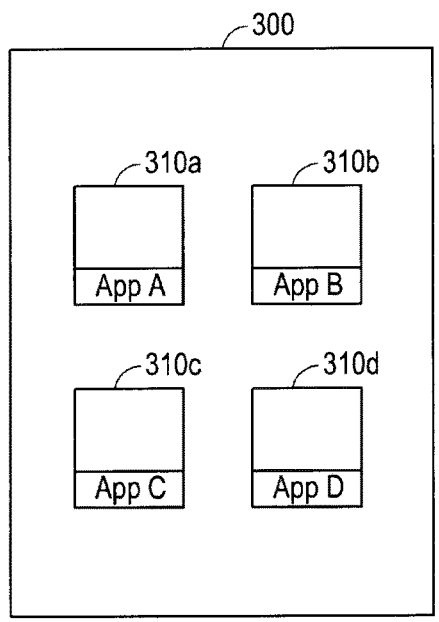
FIGS. 3A, 3B, 3C and 3D illustrate screens showing a first example of a procedure for using a portable terminal according to an embodiment of the present invention.
Figure 3B:
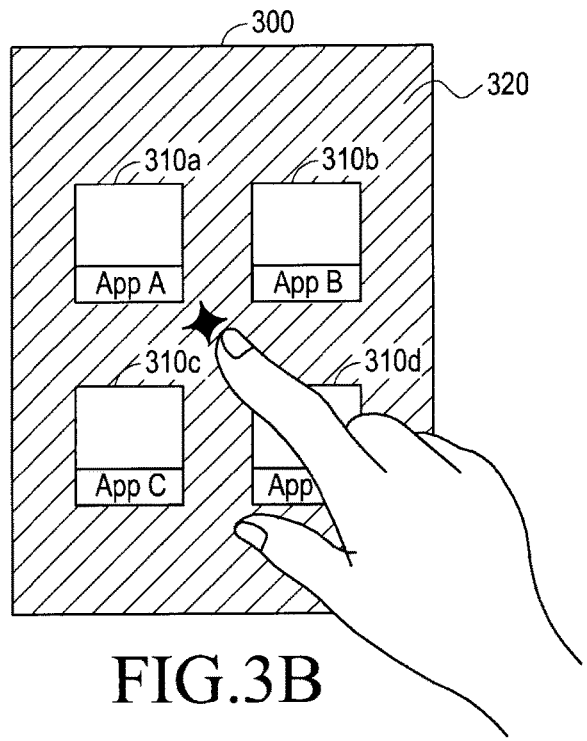

In step S201, as shown in FIG. 3B, the predetermined area touched by the user is a background area 320, in which icons 310a to 310d corresponding to applications operating in the portable terminal, menus (not shown), various information (e.g. electro luminescent information, battery information, time information, etc.), etc. are not displayed.

Figure 3C:
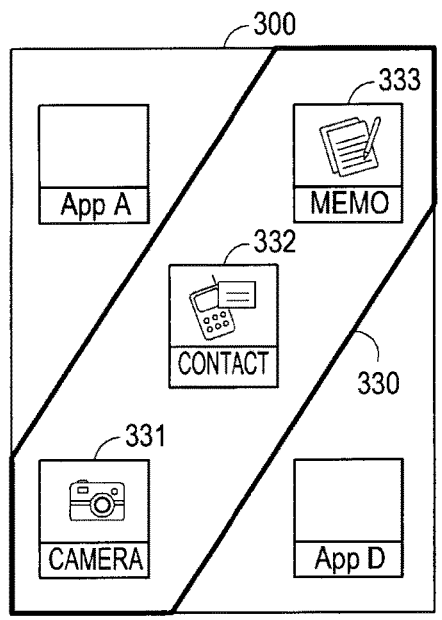

That is, the user can request that a separate display area be displayed as shown in FIG. 3C, by touching the background area 320 shown in FIG. 3B or in an area designed for such, in which the icons 310a to 310d displayed in a display screen 300 shown in FIG. 3A are not displayed. Therefore, when the controller 10 according to the embodiments of the present invention detects that the background area 320 is activated or touched by the user, the controller 10 generates the separate display area 330 as shown in FIG. 3C and makes a control such that one or more applications (or icons corresponding to the applications) are displayed in the generated display area 330.

As shown in FIG. 3C, applications displayed in the generated display area 330 include a camera-related application 331, a contact number-related application 332, and a memo-related application 333. Here, the applications 331 to 333 displayed in the display area 330 may be applications preselected (or preset) by the user or applications which have been executed more than a predetermined number of times.

According to the embodiments of the present invention, the user can preselect applications to be displayed in the display area 330 when the user touches the predetermined area 320 (for example, background area). Further, according to the embodiments of the present invention, the user can set that a predetermined number of used (executed) applications (e.g. top three applications frequently executed) to be displayed in the display area 330.

In steps S203 to S204, when the user drags any one among the displayed applications to the outside of the display area 330, the controller 10 makes a control such that at least one of data or functions provided by the application dragged to the outside of the display area 330 is displayed.

After the user touches the application which the user desires to execute, the user can identify (search for) the data or the function provided by the corresponding application through the touch input of dragging the application to the outside of the display area 330.

Figure 3D:
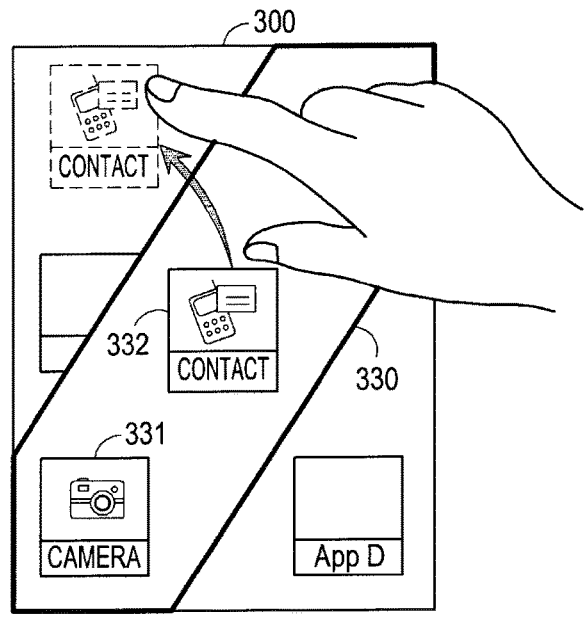

For example, the user can touch the contact number-related application 332 among applications displayed in the display area 330 and then drag the contact number-related application 332 to the outside of the display area 330 as shown in FIG. 3D. Through such a drag, the user can request that the data and/or functions provided by the contact number-related application 332 be displayed in the display area as shown in FIG. 4A.

In FIG. 4A, 332a to 332c indicate data lists of communication counterparts of which the names begin with letter "A", letter "B", and letter "C", respectively, 332d to 332f indicate data lists of communication counterparts of which the Korean names begin with letter "ㄱ", letter "ㄴ", and letter "ㄷ", respectively, 332g is a function capable of adding a new contact number among functions provided by the contact number-related application 332, and 332f is a function capable of editing the existing contact number among functions provided by the contact number-related application 332.

FIG. 5A illustrates the case, in which when the camera-related application 331 shown in FIG. 3A is dragged to the outside of the display area 330, functions 331a to 331d provided (or supported) by the corresponding application are displayed in the display area 330. FIG. 5B illustrates the case, in which when the memo-related application 333 shown in FIG. 3D is dragged to the outside of the display area 330, data 333a to 333d and a function 333e provided by the corresponding application are displayed in the display area 330.

Meanwhile, in step S203 according to the embodiments of the present invention, it is assumed that the user continuously performs the touch input in the display screen 300 without removal (e.g. user's finger is kept being in contact with the display screen) after dragging the application, which the user desires to execute, to the outside of the display area 330. Alternatively, the user can release the touch input after dragging the application for a subsequent touch input activation within the display area 330.

Thereafter, in steps S205 to S206 when a continued touch input is made after dragging the application outside the display area, the controller 10 determines whether a touch input is terminated after pointing to one of data 332a to 332f among data displayed in the display area 330. If so, the controller 10 makes a control such that the existing data or sub items (see FIG. 4c) are displayed in the display area 300.

Similarly, in step S207 to S208, the controller 10 determines whether a touch input is terminated after pointing to one of functions 332g and 332f among functions displayed in the display area 330. If so, the controller 10 makes a control such that sub items (not shown) associated with the activated function is displayed in the display area 300.

The user can identify the data or execute the function by selecting any one among the data 332a to 332f and the functions 332g and 332f shown in FIG. 4A. Steps S205 to S206 correspond to a process of requesting a data identification by the user, and steps S207 to S208 describe a process of requesting a function execution by the user.

In the embodiments of the present invention, the user can request the data identification or the function execution by dragging his/her finger to the data or the function, which the user desires to identify or execute, and then taking his/her finger off the data or the function. That is, according to the embodiments of the present invention, the controller 10 identifies that the identification of the corresponding data is requested if the touch input on the data is terminated, and the controller 10 identifies that the execution of the corresponding function is requested if the touch input on the function is terminated.

Referring to FIGS. 4B to 4D, the user drags his/her finger to the data list 332a and then takes his/her finger off the data list 332a (the touch input is terminated at the data list 332a), so that the user can request the identification of the data list 332a (i.e, sub-items), in which the names begin with a letter A, from the contact number-related application 332, and in response to the request by the user, the controller 10 displays the lists of communication counterparts, of which names begin with a letter A, as shown in FIG. 4C. Subsequently, the user selects any one (e.g. list 332a-4) among the communication counterpart lists displayed in the display screen 300, and the controller 10 displays personal information of the selected communication counterpart (e.g. Andrew Blake) in response to the selection by the user as shown in FIG. 4D.

Meanwhile, in the embodiments of the present invention described above with reference to FIG. 2, the user takes his/her finger off the touch screen only one time while the data, which the user desires to identify, are displayed or the function, which the user desires to execute, is executed. The touch input (e.g. as shown in FIG. 3D) used when the user drags the application to transfer to the outside of the display area is considered to be kept in a touch state until the termination of the touch input by the user (the termination means that the user takes his/her finger off the touch screen as shown in FIG. 4B).

That is, the user drags a predetermined application to the outside of the display area 330 and keeps his/her finger being in contact with the touch screen until data or functions provided by the application dragged to the outside of the display area 330 are displayed. Thereafter, the user drags his/her finger to the data or the function, which the user desires to identify or execute, and then takes his/her finger off the touch screen, so that the user can request data identification or function execution.

According to the embodiments of the present invention, it is not necessary for the user to perform the touch input (e.g. an act of touching the touch screen) several times in order to identify (display) the data or execute the function, and it is possible to identify the data or execute the function by only performing the drag input and then taking his/her finger off the touch screen.

As described above, the present invention enables users to easily search for data and execute applications in portable terminals.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A method for providing a user interface on a touch screen of a portable terminal, comprising:

displaying a first display area and a plurality of second display areas adjacently above and below the first display area on the touch screen in response to an input on the touch screen, wherein the first display area includes a plurality of application icons, and wherein the plurality of second display areas include a second plurality of application icons;

in response to detecting dragging of at least one application icon in the first display area to a second display area of the plurality of second display areas by a drag input on the touch screen, displaying at least one data item or at least one function associated with the dragged at least one application icon in the first display area; and when the at least one data item or the at least one function is displayed on the touch screen and the at least one application icon is dragged away from at least one icon of the second plurality of application icons separate from the dragged at least one application icon, partially removing and partially maintaining the at least one icon in display, while maintaining display of at least one other icon of the second plurality of application icons displayed on the touch screen also separate from the dragged at least one application icon, wherein when the at least one icon is partially removed and partially maintained in display, the partially maintained at least one icon is disposed at a same display position both before detecting the drag input and after detecting the drag input.

2. The method as claimed in claim 1, further comprising:

displaying sub-items associated with the at least one data item associated with the at least one application icon dragged when the drag input is terminated on the second display area.

3. The method as claimed in claim 1, further comprising: executing the at least one function associated with the dragged at least one application icon when the drag input is terminated on the second display area.

4. The method as claimed in claim 1, wherein the plurality of application icons displayed in the first display area is preselected according to predetermined criteria.

5. The method as claimed in claim 1, wherein the plurality of application icons displayed in the first display area correspond to applications having been executed more than a predetermined number of times.

6. The method as claimed in claim 1, wherein the input is made to a position of a background area away from other positions in which displayed icons are disposed.

7. The method as claimed in claim 1, wherein the drag input is maintained on the touch screen without release after the at least one application icon is dragged outside the first display area and the at least one data item or the at least one function is displayed.

8. A mobile device, comprising:
a touch screen; and
at least one processor operatively coupled to memory, the at least one processor configured to:
display a first display area including a plurality of application icons and display a plurality of second display areas adjacently above and below the first display area, in response to an input on the touch screen,
wherein the plurality of second display areas include a second plurality of application icons;
responsive to detecting dragging of at least one application icon in the first display area to a second display area of the plurality of second display areas by a drag input on the touch screen, display at least one data item or at least one function associated with the dragged at least one application icon in the first display area; and
when the at least one data item or the at least one function is displayed on the touch screen and the at least one application icon is dragged away from at least one icon of the second plurality of application icons separate from the dragged at least one application icon, partially removing and partially maintaining the at least one icon in display, while maintaining display of at least one other icon of the second plurality of application icons displayed on the touch screen also separate from the dragged at least one application icon,
wherein when the at least one icon is partially removed and partially maintained in display, the partially maintained at least one icon is disposed at a same display position both before detecting the drag input and after detecting the drag input.

9. The mobile device of claim 8, wherein the at least one processor is further configured to: display sub-items associated with the at least one data item associated with the at least one application icon dragged when the drag input is terminated on the second display area.

10. The mobile device of claim 8, wherein the at least one processor is further configured to: execute to display the at least one function associated with the at least one application icon dragged when the drag input is terminated on the second display area.

11. The mobile device of claim 8, wherein the plurality of application icons displayed in the first display area is preselected according to predetermined criteria.

12. The mobile device of claim 8, wherein the plurality of application icons displayed in the first display area correspond to applications having been executed more than a predetermined number of times.

13. The mobile device of claim 8, wherein the input on the touch screen is made to a position of a background area away from where displayed icons of the background area are disposed.

14. The mobile device of claim 8, wherein the drag input is maintained on the touch screen without release after the at least one application icon is dragged outside the first display area and the at least one data item or the at least one function is displayed.

15. A method for controlling a mobile device, the method comprising:
displaying a menu screen including a first set of application icons corresponding to applications in the mobile device;
detecting an input on a touch screen of the mobile device for displaying a first area, while the menu screen is displayed;
displaying the first area to replace display of at least a portion of the menu screen in response to detecting the input, such that at least the portion of the menu screen including a portion of at least one icon of the first set of application icons is removed from display and another portion of the menu screen other than at least the portion of the menu screen is displayed with the first area,
wherein the first area includes a second set of application icons, wherein at least part of the first set of application icons is different from at least part of the second set of application icons, and wherein the menu screen is divided into two regions separated by the first area; and
in response to detecting a drag input dragging a first application icon of the second set of application icons out of the first area to one of the two regions, displaying at least one data item or at least one function associated with the dragged first application icon in the first area,
wherein when the at least one data item or the at least one function associated with the dragged first application icon is displayed and the first application icon is dragged away from one of the first set of application icons separate from the dragged first application icon, the one of the first set of application icons is at least is partially removed and partially maintained in display, wherein when the one of the first set of application icons is partially removed and partially maintained in display, the partially maintained one of the first set of application icons is disposed at a same display position both before detecting the drag input and after detecting the drag input.

16. The method as claimed in claim 15, wherein the executing at least one data item or at least one function associated with the dragged first application icon comprises executing the at least one data item or at least one function associated with the first application icon when the drag input is terminated outside of the first area,
wherein when the executed at least one data item or the at least one function is displayed unobstructedly on the screen, all of the second set of application icons are removed from display.

17. The method as claimed in claim 15, wherein the second set of application icons is preselected according to predetermined criteria.

18. The method as claimed in claim 15, wherein the second set of application icons corresponds to applications executed more than a predetermined number of times.

19. The method as claimed in claim 15, further comprising: displaying the first application icon moveable according to the drag input.

20. The method as claimed in claim 15, further comprising:
when the executed at least one data item or the at least one function is displayed unobstructedly on a screen of the mobile device, removing at least one undragged icon of the second set of application icons from display.

21. A mobile device, comprising:
a touch screen; and
at least one processor coupled to memory, the at least one processor configured to:
control the touch screen to display a menu screen including a first set of application icons corresponding to applications in the mobile device,
detect, through the touch screen, an input for displaying a first area, while the menu screen is displayed on the touch screen,
control the touch screen to display the first area to replace display of at least a portion of the menu screen in response to detecting the input, such that at least the portion of the menu screen including a portion of at least one icon of the first set of application icons is removed from the touch screen and another portion of the menu screen other than at least the portion of the menu screen is displayed with the first area,
wherein the first area includes a second set of application icons,
wherein at least part of the first set of application icons is different from at least part of the second set of application icons, and
wherein the menu screen is divided into two regions separated by the first area, and
in response to detecting a drag input dragging a first application icon of the second set of application icons out of the first area to one of the two regions, display at least one data item or at least one function associated with the dragged first application icon in the first area,
wherein when the at least one data item or the at least one function associated with the dragged first application icon is displayed and the first application icon is dragged away from one of the first set of application icons separate from the dragged first application icon, the one of the first set of application icons is partially removed and partially maintained in display, and wherein when the one of the first set of application icons is partially removed and partially maintained in display, the partially maintained one of the first set of application icons is disposed at a same display position both before detecting the drag input and after detecting the drag input.

22. The mobile device as claimed in claim 21, wherein the at least one processor is further configured to execute the at least one data item or at least one function associated with the first application icon when the drag input is terminated outside of the first area, and
wherein when the executed at least one data item or the at least one function is displayed unobstructedly on the screen, all of the second set of application icons are removed from display.

23. The mobile device as claimed in claim 21, wherein the second application icon set is preselected according to predetermined criteria.

24. The mobile device as claimed in claim 21, wherein the second set of application icons corresponds to applications executed more than a predetermined number of times.

25. The mobile device as claimed in claim 21, wherein the at least one processor is further configured to control the touch screen to display the first application icon moveable according to the drag input.

26. The mobile device as claimed in claim 21, wherein the at least one processor is further configured to:
when the executed at least one data item or the at least one function is displayed unobstructedly on the touch screen, remove at least one undragged icon of the second set of application icons from display.

* * * * *